United States Patent
Brodalla

(10) Patent No.: US 9,962,811 B2
(45) Date of Patent: May 8, 2018

(54) METHOD AND BLASTING MEANS FOR PRODUCING A SANITIZED FINISH ON AN ALUMINUM SUBSTRATE

(75) Inventor: Dieter Brodalla, Düsseldorf (DE)

(73) Assignee: VULKAN INOX GMBH (DE)

( * ) Notice: Subject to any disclaimer, the term of this patent is extended or adjusted under 35 U.S.C. 154(b) by 450 days.

(21) Appl. No.: 14/426,794

(22) PCT Filed: Sep. 10, 2012

(86) PCT No.: PCT/EP2012/067666
§ 371 (c)(1),
(2), (4) Date: Mar. 9, 2015

(87) PCT Pub. No.: WO2014/037059
PCT Pub. Date: Mar. 13, 2014

(65) Prior Publication Data
US 2015/0246426 A1    Sep. 3, 2015

(51) Int. Cl.
*B24C 1/06* (2006.01)
*B24B 11/00* (2006.01)
*B24C 11/00* (2006.01)
*C09G 1/00* (2006.01)
*C09K 3/14* (2006.01)
*C25D 11/18* (2006.01)

(52) U.S. Cl.
CPC .............. *B24C 11/00* (2013.01); *B24C 1/06* (2013.01); *C09G 1/00* (2013.01); *C09K 3/1409* (2013.01); *C25D 11/18* (2013.01)

(58) Field of Classification Search
CPC .. B24C 1/06; B24C 11/00; C09K 3/14; C09K 3/1409

USPC ........................... 451/38, 39, 40, 75
See application file for complete search history.

(56) References Cited

U.S. PATENT DOCUMENTS

| 3,939,613 | A | * | 2/1976 | Ayers | B24C 11/00 451/39 |
| 4,714,528 | A | | 12/1987 | Takeuchi et al. | |
| 6,036,785 | A | | 3/2000 | Ferrell | |
| 2008/0120917 | A1 | * | 5/2008 | Kinsinger | C09K 3/1481 51/308 |
| 2009/0020572 | A1 | * | 1/2009 | Binder | B60R 9/04 224/309 |

FOREIGN PATENT DOCUMENTS

EP    1967613 A1    9/2008

OTHER PUBLICATIONS

International Search Report; PCT/EP2012/067666; dated Sep. 10, 2012; 2 pgs.

* cited by examiner

*Primary Examiner* — Robert Rose
(74) *Attorney, Agent, or Firm* — Schmeiser, Olsen & Watts, LLP

(57) ABSTRACT

A method and a blasting material for producing a satinized surface on an aluminum substrate is provided. There is proposed a method for producing a satinized surface on an aluminum substrate, including the steps:
 providing an aluminum substrate;
 treating by blasting with a blasting material the surface regions of the aluminum substrate provided that are to be satinized; wherein there is used as the blasting material a mixture of angular and spherical particles having a grain diameter $D_{90}$ of ≤0.3 mm.

16 Claims, 1 Drawing Sheet

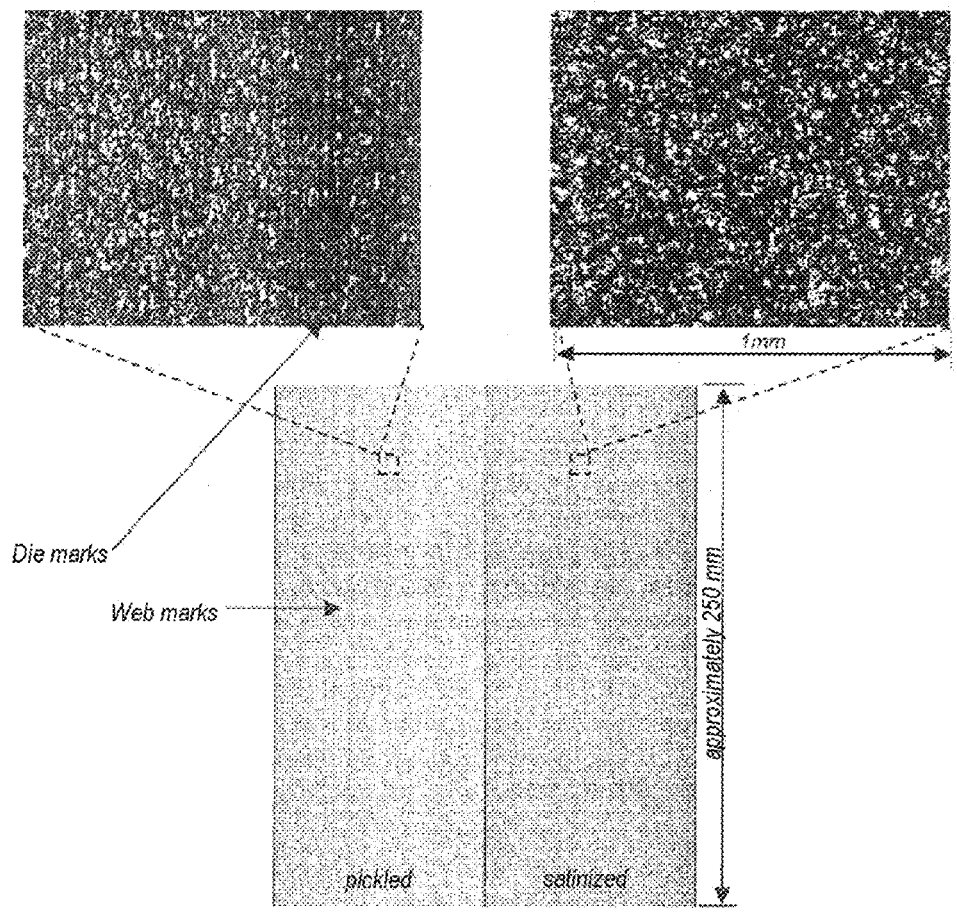

METHOD AND BLASTING MEANS FOR PRODUCING A SANITIZED FINISH ON AN ALUMINUM SUBSTRATE

CROSS-REFERENCE TO RELATED APPLICATIONS

This application claims priority to PCT Application No. PCT/EP2012/067666, having a filing date of Sep. 10, 2012, the entire contents of which are hereby incorporated by reference.

FIELD OF TECHNOLOGY

The following relates to a method and a blasting material for producing a satinized finish or also called "satinized surface" on an aluminium substrate.

BACKGROUND

Anodized aluminium components are nowadays used in many fields in which, on the one hand, the decorative "aluminium look" is to be preserved and, on the other hand, corrosion protection of the sensitive aluminium surfaces are required. Fields which may be mentioned are the window and structural facings sector, or also the automotive field and domestic appliances.

Before the anodization, the aluminium parts are in most cases pickled in order to free the aluminium surfaces of impurities and remove the oxide layer (passive layer) that is naturally present. Depending on the type of treatment, semi-matte to matte-glossy surfaces are produced which, owing to their appearance, are referred to as so-called "satinized" surfaces.

In order to achieve improved corrosion protection, and also for design reasons, the aluminium components are anodized, that is to say an oxide layer is initiated by means of electrolysis. This method is also referred to as anodization, wherein aluminium is oxidized electrolytically. The aluminium surfaces so treated can also be dyed before final sealing.

The oxide layers produced by the anodization of aluminium and aluminium alloys are far superior to the oxide layers that occur naturally on the aluminium surfaces in terms of mechanical properties, corrosion resistance and decorative appearance. Good corrosion resistance to industrial and marine atmospheres is achieved with oxide layers of 20 µm. The oxide layer that is produced is not electrically conductive.

In order to be able to form homogeneous oxide layers, the anodization is preceded by mechanical or chemical pretreatment methods. These are specified, for example, in DIN 17611. Table 1 shows the designation system for the pretreatment of aluminium surfaces according to the mentioned DIN 17611.

TABLE 1

| Symbol | Type of pretreatment | Notes |
|---|---|---|
| E0 | Degreasing and deoxidation | Surface treatment before anodization, in which the surface is degreased and deoxidized without further pretreatment. Mechanical surface flaws, e.g. pits and scratches, remain visible. Areas of corrosion which were scarcely noticeable before the treatment can be visible after the treatment. |
| E1 | Grinding | Grinding leads to a comparatively uniform but slightly dull-matt appearance. All surface flaws present are largely removed, but grinding marks can remain visible. |
| E2 | Brushing | Mechanical brushing produces a uniform glossy surface with visible brush strokes. Surface flaws are only partly removed. |
| E3 | Polishing | Mechanical polishing leads to a glossy, bright surface, while surface flaws are only partly removed. |
| E4 | Grinding and brushing | By means of grinding and brushing, a uniformly glossy surface is achieved; mechanical surface flaws are removed. Areas of corrosion which can become visible with treatments E0 or E6 are removed. |
| E5 | Grinding and polishing | By means of grinding and polishing, a smooth, glossy appearance is achieved; mechanical surface flaws are removed. The effects of corrosion, which can become visible with treatments E0 or E6, are removed. |
| E6 | Pickling | After degreasing, the surface acquires a semi-matt or matt sheen by being treated with special alkaline pickling solutions. Mechanical surface flaws are evened out but not removed completely. The effects of corrosion on the metal surface can become visible upon pickling. A mechanical pretreatment prior to pickling can remove these effects; however, it is more beneficial to treat and store the metal in such a manner that corrosion is avoided. |
| E7 | Chemical or electrochemical polishing | After degreasing of the surface in a vapor degreasing agent or in a non-etching cleaning agent, a high-gloss surface is obtained by treatment in special chemical or electrochemical bright plating baths. Surface flaws are removed to only alimited degree, and effects of corrosion can become visible. |
| E8 | Polishing and chemical or electrochemical polishing | Grinding and polishing with subsequent chemical or electrochemical polishing. This treatment leads to a high-glossappearance; mechanical surface flaws and the beginnings of corrosion are generally removed. |

The mechanical, chemical and/or electrochemical pretreatments serve to prepare the surface of the aluminium substrates for the anodic oxidation. Specific surface effects can be achieved thereby. They serve to clean the surfaces of the components, to remove oxide layers (passive layer or incorrectly anodized surfaces) and surface defects. A uniform appearance of the surface is thereby achieved, and the resulting bright aluminium surface permits a brisk ion exchange during electrolysis. In addition, specific desired and also undesired structures are created, such as, for example, grinding and brush marks.

One of the chemical treatment methods that is frequently used is pickling of the aluminium substrate surfaces, which is also known as E6 treatment. Uniformly matte and decorative surfaces are thereby created; the so-called E6 finish. The irregularities on the surface that are produced by the extrusion of profiles and the rolling of metal sheets are to be covered or removed. Structural irregularities, such as web marks and welding seams, caused by the technology are also to be mattified as far as possible so that they are not troublesome from a decorative point of view.

Owing to the amphoteric properties of the aluminium surfaces, the component surface can be pickled both using bases and using acids. The oxide layer that is naturally present on the aluminium surface is thereby removed and any defects in the surface resulting from the production process are lessened. Consequently, a bright aluminium surface is obtained. This permits the very good ion exchange that is necessary for the subsequent electrolytic treatment.

In most cases, the aluminium substrates to be treated are introduced into an immersion bath containing an aqueous solution of sodium hydroxide (NaOH). Owing to its chemical properties, the sodium hydroxide solution serves both to remove impurities such as fats and oils and to pickle the aluminium surfaces. In many cases, however, cleaning and pickling take place separately, because a significantly lower NaOH concentration is sufficient for cleaning and thus, for example, less NaOH is carried into the subsequent rinsing tank. The cleaning process is referred to according to DIN17611 as E0. However, depending on the content of any alloying constituents of the substrate or on the effect to be achieved, further sodium compounds such as silicates, carbonates or phosphates can also be used.

Sodium oxide carries out a very strong attack on the oxides, oxide hydrates and the base metal of the aluminium substrate, which is about 20 times greater than at comparable acid concentrations. For an optimum reaction procedure, the dipping bath must be maintained in a defined temperature range. The temperature inside the pickling bath is dependent on the utilization over time. That is to say, the pickling bath must be heated if the supply of aluminium is low or, in the case of a very high aluminium supply, must also be cooled on account of the increased exothermic reaction in order to be kept in the optimum temperature range.

By the use of sodium hydroxide solution, the oxides and oxide hydrates are reacted as follows:

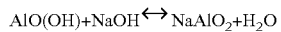
$AlO(OH) + NaOH \leftrightarrow NaAlO_2 + H_2O$

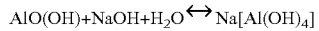
$AlO(OH) + NaOH + H_2O \leftrightarrow Na[Al(OH)_4]$

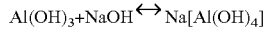
$Al(OH)_3 + NaOH \leftrightarrow Na[Al(OH)_4]$

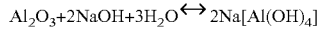
$Al_2O_3 + 2NaOH + 3H_2O \leftrightarrow 2Na[Al(OH)_4]$

In addition, the lye also attacks the base metal:

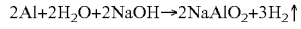
$2Al + 2H_2O + 2NaOH \rightarrow 2NaAlO_2 + 3H_2\uparrow$

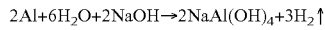
$2Al + 6H_2O + 2NaOH \rightarrow 2NaAl(OH)_4 + 3H_2\uparrow$

That is to say, sodium aluminate ($NaAl(OH)_4$) and hydrogen ($H_2$) form as reaction products. By adding additives such as, for example, nitrates or nitrites to the pickling medium, the evolution of hydrogen can be inhibited and the pickling operation accelerated, as a result of which the base metal is attacked to a lesser degree. However, these additives can lead to the formation of further critical waste products, such as, for example, ammonia, which pollute the waste water.

Furthermore, aluminium hydroxide can be deposited in the tank on the walls and the heating elements, so-called scale formation, which can hinder operation and in particular significantly impair the efficiency of the heating elements. Scale formation can be counteracted by adding complexing agents such as gluconates or phosphonates. However, such complexing agents are also environmentally relevant and can pollute the waste water.

Accordingly, depending on the particular process technique, the pickling process produces various types of waste, which are disposed of or treated in different ways. The consumed pickle and the resulting sludge must be disposed of as waste, which gives rise to disposal costs. The sludge produced from the pickle is usually deposited, which is associated with further disposal costs. Together, these disposal costs represent a considerable cost factor in the surface treatment of aluminium substrates.

In addition, the attack of the pickle on the aluminium surface to produce a so-called E6 finish also brings about the removal of an amount of material of up to 100 $g/m^2$ or 30 μm. The attack and the removal of material thereby take place not only on the outside faces with a decorative requirement, but also on the inside faces, which remain invisible. In total, the amount of material removed is therefore up to 200 $g/m^2$ or 60 μm of the total profile. The consumption of pickling agent is thereby linearly dependent on the amount removed. The loss of pickling agent by the removal of material that is caused can be compensated for relatively easily by adding fresh pickle. However, the sodium aluminate complex that forms also causes an increase in the viscosity of the pickle, as a result of which the pickling process becomes less effective over time. As the aluminium concentration increases, aluminium hydroxide also precipitates from the pickling medium and settles as a sludge-like deposit in the pickling tank. The pickling bath must therefore be renewed or replaced at regular intervals. Methods according to the current prior art are accordingly associated with a high occurrence of environmentally critical substances and a high energy consumption.

SUMMARY

An aspect relates to a method for producing satinized surfaces on aluminium substrates which is capable of overcoming the mentioned disadvantages. In particular, it is an aspect of embodiments of the present invention to provide a method for producing satinized aluminium surfaces whose appearance is substantially identical to the aluminium surfaces produced by treatment according to DIN 17611 E6.

There is accordingly proposed a method for producing a satinized surface on an aluminium substrate, comprising the method steps:
providing an aluminium substrate;
treating by blasting with a blasting material the surface regions of the aluminium substrate provided that are to be satinized; wherein there is used as the blasting material a mixture of angular and spherical particles having a grain diameter $D_{90}$ of ≤0.3 mm.

According to one embodiment there is proposed a method for producing a satinized surface on an aluminium substrate, comprising the method steps:

providing an aluminium substrate;

treating by blasting with a blasting material the surface regions of the aluminium substrate provided that are to be satinized;

anodizing the surface regions treated by blasting; and sealing the anodized surface regions, wherein there is used as the blasting material a mixture of angular and spherical particles having a grain diameter $D_{90}$ of ≤0.3 mm.

According to one embodiment there is proposed a method for producing a satinized surface on an aluminium substrate, comprising the method steps:

providing an aluminium substrate;

treating by blasting with a blasting material the surface regions of the aluminium substrate provided that are to be satinized;

anodizing the surface regions treated by blasting; and sealing the anodized surface regions, wherein as the blasting material a mixture of angular and spherical particles having a grain diameter $D_{90}$ of ≤0.3 mm and ≥0.01 mm. is used.

According to one embodiment, the blasting material can be so chosen that the mixture comprises angular and spherical particles having a grain diameter $D_{90}$ of ≤0.3 mm and ≥0.01 mm, preferably from ≤0.2 mm to ≥0.01 mm, more preferably from ≤0.1 mm to ≥0.01 mm, additionally preferably from ≤0.05 mm to ≥0.01 mm and further preferably from ≤0.02 mm to ≥0.01 mm.

Unless indicated otherwise, the expression "particle diameter" and "grain diameter" as used in the present description refers to a particle diameter and grain diameter $D_{90}$, that is to say at least 90% of the total particle composition or of the total grain composition have the indicated particle or grain diameter.

The respective contents of the angular and round particles, indicated in % by weight, are so chosen that the total composition of angular and round particles does not exceed 100% by weight.

According to one embodiment, the blasting material can be so chosen that the mixture comprises angular and spherical particles as new grain with the following particle diameter distribution:

>0.315 mm=<0.1%;
≤0.315 to ≥0.200 mm=≤5%;
<0.200 mm and ≥0.050 mm=≥95%
<0.050 mm=<0.1%, based on the total blasting material mixture.

According to embodiments of the invention, it can be provided in one embodiment of the method that the blasting material particle mixture is sieved and/or screened before being applied to the substrate surface, in order to ensure that no particles above and/or below the particle diameter provided according to embodiments of the invention are present.

Surprisingly, it has been shown that, with mechanical treatment of the aluminium surface and subsequent anodization and sealing, it is possible to achieve a finish, preferably an E6 finish, which has a substantially or even an identical appearance to aluminium surfaces correspondingly treated by pickling. By dispensing with pickling, the environmentally critical waste products are advantageously avoided. In addition, tempering of the pickling baths is not necessary, as a result of which a substantial portion of the energy to be used in the aluminium surface treatment can be saved. Ultimately, in the mechanical surface treatment according to embodiments of the invention, only the surface regions of the aluminium substrate that are ultimately visible are treated. Regions that are not visible, such as, for example, the inside of hollow profiles, are not treated, unlike in the pickling treatment according to the prior art, as a result of which the amount of material removed, based on the profile as a whole, is substantially reduced. As a result, material savings on the aluminium substrate are possible. In particular, it has been shown that structural faults in the aluminium substrate, such as, for example, web marks or welding seams, can be removed substantially better by means of the blasting treatment according to embodiments of the invention than was hitherto possible with a chemical method, such as a pickling treatment. This is also true of more pronounced surface defects such as pressing marks or scratches.

In addition, the blast treatment according to embodiments of the invention is significantly more environmentally friendly compared with chemical surface treatment methods.

The term particle and grain or grains are used synonymously in the description.

Within the meaning of the embodiment of the invention, the term "spherical" in connection with particles and grains means that the particles and grains are substantially round, that is to say their length is smaller than twice their diameter.

Within the meaning of the embodiment of the invention, the term "angular" in connection with particles and grains mean that the particles and grains are not spherical, have edges and broken edges have sharp edges.

All physical data relating to the particles according to embodiments of the invention refer to a so-called "new grain", unless indicated otherwise.

The expression "new grain" in connection with embodiments of the present invention refers to grains or particles before use as blasting material.

The expression "operating state" in connection with embodiments of the present invention relates to particles when used as blasting material, which have been delivered to a blasting material machine for blasting onto an aluminium component and circulate therein.

Requirements of blasting materials in general are set down in standards DIN 8201; DIN ISO 11124 and SAE J 444, to which reference is made here in their entirety.

Blasting materials of angular and spherical grain which can be used according to embodiments of the invention can, however, also have sieve analyses which lie outside the above standards.

Application of the blasting material particle mixture to the aluminium substrate surface can be carried out according to embodiments of the invention both by means of compressed air and by means of centrifugal wheel technology. While in the case of the application of the blasting material particle mixture to the aluminium substrate surface by means of compressed air, the blasting material particles are carried by a compressed air jet and accelerated onto the substrate surface, in the case of centrifugal wheel technology, the blasting material particles are accelerated to the desired speed by a rapidly rotating centrifugal wheel. It is also possible to use the blasting material particle mixture in conjunction with, for example, aqueous suspensions. Such application of the blasting material particle mixture by means of a wet-jet method using water pressure and a nozzle or by means of a centrifugal wheel is rarely used for such profile machining. Possible dust formation during blast treatment can thereby be reduced, for example.

The use of angular particles in the blast treatment of aluminium surfaces does not lead to the desired E6 surface quality. In fact, the surface obtained by the use of angular particles tends to be rough. The surface tends to remain rough as a result of the pretreatment with angular particles. The quality of the resulting aluminium surface is nowhere near the desired E6 surface quality. The use of spherical particles does not lead to the removal of pressing marks or to the desired E6 surface quality of aluminium. Nor does the use of spherical particles in the first treatment step and the use of angular particles in a subsequent second step lead to an aluminium surface having anything like the desired E6 surface quality. On the contrary, a significantly rougher surface than with the above-mentioned treatment sequence is achieved. On the other hand, a specific mixture of angular and spherical particles surprisingly, and without chemical treatment, leads to the desired aluminium E6 surface quality.

Without wishing to be bound to this theory, it is assumed that the angular particles contained in the blasting material particle mixture exert an abrasive action on the substrate surface, by means of which the natural oxide layer on the substrate as well as any impurities are removed, while the spherical particles exert a surface-sealing action.

By the use of the blasting material particle mixture according to embodiments of the invention, a "sanitization", as it were, of the surface of aluminium is achieved.

According to one embodiment, it is possible by means of the blasting material particle mixture according to embodiments of the invention to achieve a surface structure and appearance which are similar to the highest degree to the chemical E6 pickling action. In other words, it is possible by means of the use of the blasting material particle mixture according to embodiments of the invention to achieve an aluminium surface quality which corresponds to E6 surface quality.

Application of the blasting material particle mixture can take place, surprisingly, not only by means of blasting units, which ensure very uniform application, but also by hand, without the immediate formation of isotropic, direction-dependent surface structures. The surface structures produced according to embodiments of the invention, on the other hand, can be anisotropic.

According to one embodiment, the new grain blasting material particle mixture has a content of angular new grain particles of between ≤80% by weight and ≥20% by weight, preferably between ≤70% by weight and ≥30% by weight, more preferably ≤60% by weight and ≥40% by weight, in particular 50% by weight ±2% by weight, based on the total weight of the new grain blasting material particle mixture.

According to one embodiment, the new grain blasting material particle mixture has a content of round new grain particles of between ≥20% by weight and ≤80% by weight, preferably between ≥30% by weight and ≤70% by weight, more preferably ≥40% by weight and ≤60% by weight, in particular 50% by weight ±2% by weight, based on the total weight of the new grain blasting material particle mixture.

According to one embodiment, the new grain blasting material particle mixture has a content of angular new grain particles of between ≤80% by weight and ≥20% by weight, preferably between ≤70% by weight and ≥30% by weight, more preferably ≤60% by weight and ≥40% by weight, in particular 50% by weight ±2% by weight, and round particles, wherein the total amount by weight of the blasting material particle mixture of angular and spherical new grain particles is 100% by weight.

According to one embodiment, the new grain blasting material particle mixture has:

a) a content of angular new grain particles of between ≤80% by weight and ≥20% by weight, preferably between ≤70% by weight and ≥30% by weight, more preferably ≤60% by weight and ≥40% by weight, in particular 50% by weight ±2% by weight; and/or b) a content of round new grain particles of between ≥20% by weight and ≤80% by weight, preferably between ≥30% by weight and ≤70% by weight, more preferably ≥40% by weight and ≤60% by weight, in particular 50% by weight ±2% by weight;

based on the total weight of the new grain blasting material particle mixture, wherein the total composition of angular and round new grain particles is 100% by weight.

According to a further embodiment, the new grain blasting material particle mixture has a content of angular new grain particles and spherical new grain particles of in each case 50% by weight, based on the total weight of the blasting material particle mixture, wherein the amount of angular new grain particles and spherical new grain particles can each be present with a deviation of ±2% by weight.

According to a preferred embodiment of the invention, the blasting material particle mixture in the operating state has an average content of angular particles of between ≤80% by weight and ≥20% by weight, preferably between ≤70% by weight and ≥30% by weight, more preferably ≤60% by weight and ≥40% by weight, in particular 50% by weight ±2% by weight.

The expression "operating state" is to be understood as meaning that it is the average composition of the blasting material during the blasting operation.

According to a further embodiment, the blasting material particle mixture in the operating state has an average content of angular particles of between ≤75% by weight and ≥35% by weight, preferably between ≤70% by weight and ≥45% by weight, based on the total composition of the blasting material particle mixture.

The blasting material particle mixture used in the method according to embodiments of the invention is subject to a certain amount of wear. In particular, the angular blasting material particles present become worn during use. It can therefore be provided according to embodiments of the invention that the blasting material particle mixture is supplemented during use in order to maintain its efficiency. It can in particular be provided that the blasting material particle mixture is supplemented continuously or discontinuously with a blasting material particle mixture which has a content of angular particles of between ≤80% by weight and ≥50% by weight, in particular 75% by weight ±2% by weight, and a content of spherical particles, wherein the total amount by weight of the blasting material particle mixture of angular and spherical particles is 100% by weight.

According to a further embodiment, the blasting material particle mixture in the operating state has an average content of angular particles of between ≤80% by weight and ≥35% by weight, preferably between ≤70% by weight and ≥45% by weight, in particular 50% by weight ±2% by weight, and round particles, wherein the total amount by weight of the blasting material particle mixture of angular and spherical particles is 100% by weight.

According to a further embodiment, the blasting material particle mixture in the operating state has an average content of angular particles and spherical particles of in each case 50% by weight, based on the total weight of the blasting material particle mixture, wherein the amount of angular new grain particles and spherical new grain particles can each optionally be present with a deviation of ±2% by weight.

According to one embodiment, the blasting material particle mixture in the operating state has an average content of spherical particles of between ≥20% by weight and ≤80% by weight, preferably between ≥30% by weight and ≤70% by weight, more preferably ≥40% by weight and ≤60% by weight, in particular 50% by weight ±2% by weight, based on the total weight of the new grain blasting material particle mixture.

According to one embodiment, the blasting material particle mixture in the operating state can have an average content:
a) of angular particles of ≤80% by weight and ≥20% by weight, preferably between ≤70% by weight and ≥30% by weight, more preferably ≤60% by weight and ≥40% by weight, in particular 50% by weight ±2% by weight; and/or
b) of spherical particles of between ≥20% by weight and ≤80% by weight, preferably between ≥30% by weight and ≤70% by weight, more preferably ≥40% by weight and ≤60% by weight, in particular 50% by weight ±2% by weight, based on the total weight of the blasting material particle mixture in the operating state.

By corresponding continuous or discontinuous addition, the average blasting material particle mixture can be maintained during the operating state.

According to a further embodiment, there can be added to the blasting material mixture during the operating state new grain blasting material having a content of angular particles and spherical particles of in each case 50% by weight with a deviation of ±2% by weight, based on the total weight of the blasting material particle mixture, wherein the total weight of angular and spherical particles is 100% by weight.

According to a further embodiment, there can be added to the blasting material mixture during the operating state new grain blasting material having a content of angular particles of 70% by weight ±2% by weight and spherical particles of 30% by weight ±2% by weight, based on the total weight of the blasting material particle mixture, wherein the total weight of angular and spherical particles is 100% by weight.

Spherical particles generally have a longer lifetime than angular particles. Angular particles have a tendency to break during the operating state; the spherical particles, on the other hand, are made of a far more ductile material and consequently have a significantly lower tendency to break.

It is accordingly possible to add larger amounts of angular particles as compared with spherical particles during the operating state, in order to maintain the average blasting material particle mixture during the operating state.

It is pointed out in this connection that particles having a diameter of <0.01 mm, also referred to as dust, are not to be understood as being blasting material particles within the meaning of this invention, so that all the % by weight data do not include particles having a diameter of <0.01 mm.

According to a further embodiment of the method according to embodiments of the invention, the angular particles have an average hardness of ≥600 HV, in particular ≥640 HV, preferably ≥750 HV and preferably ≥600 HV and ≤800 HV.

Angular particles having a hardness in the range of ≥600 HV and ≤800 HV are commercially available, for example, from Vulkan-Inox under the mark Grittal®.

It has been shown that angular blasting material particles in this hardness range, in combination with the spherical particles, achieve optimum removal of the surface for producing the desired satin effect on the aluminium surface. In particular, the angular blasting material particles can be iron-based metal alloys, preferably iron-based metal alloys which have a martensitic matrix with chromium carbides, and preferably stainless steel particles, in particular stainless special steels. Preferably, the stainless steel comprises chromium carbides. More preferably, the stainless steel has a chromium content of 30% by weight ±2% by weight and a carbon content of 2% by weight ±0.5% by weight. Particularly preferably, the angular particles can consist of a chromium carbide-containing stainless steel.

According to a further embodiment of the method according to embodiments of the invention, the spherical particles have an average hardness of ≥250 HV, preferably ≥280 HV, preferably ≥300 HV, more preferably ≥350 HV, yet more preferably of ≥400 HV and additionally preferably of ≥450 HV. According to a further embodiment, the spherical particles have an average hardness of 250 HV and ≤500 HV.

Spherical particles having a hardness in the range of ≥250 HV and ≤500 HV are commercially available, for example, from Vulkan-Inox under the mark Chronital®.

It is, however, also possible to use spherical particles having a hardness of ≥500 HV, for example ≥550 HV.

It has been shown that spherical blasting material particles in this hardness range produce optimised sealing of the surface for producing the desired satin effect in combination with the angular particles on the aluminium surface. In particular, the spherical blasting material particles can be iron-based metal alloys, preferably stainless steel particles. Preferably, the stainless steel has an austenitic microstructure. More preferably, the stainless steel has a chromium content of 18% by weight ±2% by weight and a nickel content of 10% by weight+2% by weight.

According to a further embodiment of the present invention, the stainless steel particles are particularly preferably stainless special steel.

A further advantage of the method according to embodiments of the invention is that used blasting material, because of its composition, can simply be conveyed to industrial processing, for example steel production. Accordingly, it does not represent a waste material but a commodity, which can be supplied to steel-producing companies as an additive.

The blasting speed in the blasting process, also called "the delivery speed", can be on average from ≥30 m/s to ≤100 m/s, preferably from ≥35 m/s to ≤90 m/s, more preferably from ≥40 m/s to ≤80 m/s, more preferably from ≥45 m/s to ≥70 m/s, and most preferably from ≥50 m/s to ≤60 m/s.

The pressure of the jet at the outlet nozzle can be from ≥2 bar to ≤10 bar, preferably from ≥3 bar to ≤8 bar, and more preferably from ≥4 bar to ≤6 bar. However, it is also possible to carry out blasting with higher pressures.

According to a further embodiment of the method according to the invention, the substrate surface to be satinized is deoxidized and/or pickled after the blast treatment and before anodization. An acidic deoxidizing or pickling bath can hereby be used.

According to a further embodiment of the method according to the invention, the substrate surface to be satinized is subjected to a polishing treatment after the blast treatment and before anodization. The satin effect can thereby advantageously be enhanced. A polishing treatment can be carried out, for example, by means of a hot acidic, preferably phosphoric acid-containing treatment solution, with which the aluminium surface treated by blasting is brought into contact. Alternatively, a polishing treatment can be carried out electrolytically in a mixture of phosphoric acid and sulfuric acid by applying a voltage. In addition, all other known polishing methods for aluminium surfaces can be used.

The anodization and sealing of the aluminium substrate surface provided according to embodiments of the invention can be carried out in the conventional manner known from the prior art, as is also described, for example, in DIN 17611.

According to a further embodiment of the method according to embodiments of the invention, it can be provided that rinsing steps are provided between the individual treatment steps in order to remove any method residues adhering to the substrate surface.

Embodiments of the present invention relates additionally to a blasting material for the blast treatment of aluminium surfaces, wherein the blasting material has a grain diameter of ≤0.3 mm, preferably ≤0.2 mm, more preferably ≤0.1 mm, which is characterized in that the blasting material in the operating state has an average content of angular particles of between ≤90% by weight and ≥30% by weight, preferably between ≤75% by weight and ≥40% by weight, in particular 50% by weight.

According to a preferred embodiment of the blasting material, the spherical particles have an average hardness ≥300 HV, preferably ≥450 HV, and the angular particles have an average hardness ≥640 HV, preferably ≥750 HV.

Particularly preferably, the angular particles comprise a chromium carbide-containing stainless steel having a martensite structure or a microstructure of δ-ferrite; or the angular particles consist of a chromium carbide-containing stainless steel having a martensite structure or of a microstructure of δ-ferrite.

BRIEF DESCRIPTION

Some of the embodiments will be described in detail, with reference to the following figures, wherein like designations denote like members, wherein:

FIG. 1 shows a comparison of the surface structures produced by pickling according to the prior techniques and blast treatment according to the invention.

DETAILED DESCRIPTION

FIG. 1 shows a comparison of the surface structures produced by pickling according to the prior techniques and blast treatment according to embodiments of the invention. As the comparison shows, the aluminium surfaces treated by blasting according to embodiments of the invention differ only insubstantially from the aluminium surfaces treated by pickling according to DIN 17611 E6, both in the normal view and in the microscopic enlargement. In fact, it is shown that the substrate surface treated according to embodiments of the invention no longer shows any web marks in the normal view. Substrate surfaces treated by blasting according to embodiments of the invention can readily be assembled with surfaces treated by means of the known pickling treatment without any visually perceptible difference between their surfaces.

Example 1

Profile sections of extruded aluminium profiles of the alloy AlMgSiO$_5$ were removed from a pressing plant for comparative tests. Sieve fractions of sieve sizes D$_{90}$ of from 0.1 mm to 0.2 mm mesh size of both angular material and spherical material were produced from blasting materials of a German manufacturer. The round blasting material was stainless steel having a chromium content of 18% by weight ±1% by weight and a nickel content of 10% by weight ±2% by weight. The angular blasting material was stainless steel having a chromium content of 30% by weight ±1% by weight and a carbon content of 2% by weight ±0.1. The prepared profile sections were then blasted in a manual cabinet with variable compressed air pressure, mixtures of the spherical and angular sieve fractions also being used.

After blasting, the profile sections were first cleaned in a cleaner for aluminium surfaces from ALUFINISH, product ALFICLEAN, then pickled gently for one minute in a dilute sodium hydroxide solution (50 g/l at 60° C.), and then deoxidized in an acidic solution of 150 g/l of sulfuric acid and a peroxidic additive (ALFIDEOX from ALUFINISH; 1 g/l) and then anodized in a bath containing 180 g/l of sulfuric acid. A current density of 1.5 A/dm was used; the anodization time was 40 minutes until a layer thickness of 20 μm was achieved. Between each of the above-mentioned treatment steps, the profile sections were rinsed, and a rinsing operation of at least one minute in tap water was also carried out after the anodization. The oxide layers produced were then sealed for one hour in hot water at 96° C. to 98° C., a so-called sealing aid from ALUFINISH, product ALFISEAL, being added to the water in a concentration of 2 g/l. The profile sections were then subjected to a comparative assessment.

In addition, after the above-mentioned cleaning and pickling, some blasted profile sections, instead of being deoxidized as mentioned above, were polished in a solution of 75% sulfuric acid, 15% phosphoric acid and 10% water at a temperature of >100° C. for one minute and then likewise anodized as described. The results of the evaluations are described briefly below:

Example 1a

In the case of the profile sections treated with the spherical blasting material particles, the web marks and welding seams on the surfaces were still wholly visible and not covered.

Example 1b

In the case of the profile sections treated with angular blasting material particles, a decoratively troublesome whitish coating was observed throughout after anodization; the surface finish of surfaces later treated with the same blasting material particles was significantly different from the first tests with fresh blasting material particles. The coverage of web marks and welding seams was significantly reduced.

Example 2

Mixtures of the angular and spherical blasting agent particles in the range of 30% spherical material and 70% angular material and 30% angular and 70% spherical blasting material particles gave a significantly more decorative surface finish, and both the web marks and the welding seams were covered to the greatest possible extent. In addition, the surface finish was reproducible in a plurality of repeat tests.

Example 3

In the case of the profile sections subjected to a polishing treatment instead of deoxidization, the surfaces treated with the mixture of spherical and angular blasting material showed an attractive, glossy, satin-like finish.

Example 4

The tests were repeated in a so-called centrifugal wheel system with some different blasting material particle mixtures. The same surface finish as had been achieved in the manual cabinet with compressed air was found, even when the pressure was varied.

Example 5

Angular new grain particles, for example of the mark Grittal® obtainable from Vulkan Inox GmbH, having a grain diameter $D_{90}$ in the range of from 0.1 mm to 0.2 mm and an average hardness of 750 HV were used as blasting material. As spherical new grain particles, particles having a grain diameter $D_{90}$ in the range of from 0.1 mm to 0.2 mm and an average hardness of 450 HV were used as the blasting material. Spherical new grain particles having an average hardness of 450 HV can be obtained, for example, using particles of the mark Chronital® obtainable from Vulkan Inox GmbH, by pre-rounding or compacting the spherical grains beforehand in a machine so that the spherical test material has a hardness of 450 HV. The angular and spherical new grain particles were mixed as indicated in Table 2.

The blasting material mixture in question, see Table 2, was delivered in a blast cabinet of type Normfinish, manufacturer Leering Hengelo BV, of series DP 14, with continuous blasting material cleaning for the treatment of an extruded standard aluminium window frame profile, for example ALMG SI 0.5, under the following conditions:

The results are shown in Table 2.
Sieve fraction $D_{90}$: <0.2 mm and >0.1 mm
Nozzle diameter: 10 mm/
Blasting pressure: 2 bar
Distance nozzle to blasting material: 300 mm
Blasting angle: 80°
Amount of Blasting Material
delivered: 7.2 kg/min.=432 kg/h
Blasting speed 1 m/min

TABLE 2

| Test | Blasting material in each case sieve fraction $D_{90}$ < 0.2 mm and >0.1 mm angular | Blasting material in each case sieve fraction $D_{90}$ < 0.2 mm and >0.1 mm spherical | Finish assessment of extruded standard aluminium window frame profiles ALMG SI 0.5 | Evaluation |
|---|---|---|---|---|
| 1 | 0 | 100 | Some pressing marks not covered; welding seams more glossy than the finish of the aluminium surface; web marks visible; | − − |
| 2 | 20 | 80 | Some pressing marks not covered; welding seams and web marks almost no longer visible; | −/+ |
| 3 | 30 | 70 | Pressing marks largely covered; welding seams and web marks no longer visible; | + |
| 4 | 40 | 60 | Pressing marks completely covered; welding seams and web marks not visible; very uniform finish; smooth aluminium surface; virtually E6 finish; | ++ |
| 5 | 50 | 50 | Pressing marks completely covered; welding seams and web marks not visible; E6 finish; | +++ |
| 6 | 60 | 40 | Pressing marks completely covered; welding seams and web marks not visible; very uniform finish similar to point 4; smooth aluminium surface; virtually E6 finish; | ++ |
| 7 | 70 | 30 | Pressing marks completely covered; welding seams and web marks not visible; finish is more matt compared to point 4 and 6; | + |
| 8 | 80 | 20 | Pressing marks, welding seams and web marks not visible, but matt and rough surface; when viewed obliquely there is a whitish finish; | −/+ |
| 9 | 100 | 0 | Pressing marks, welding seams and web marks not visible, surface is more matt and more rough than in point 8; when viewed obliquely there is a whitish finish | − − |

Evaluation:
+++ = very good correspondsto E6 finish
++ = good corresponds almost to E6 finish
+ = satisfactory, better than E5 finish
−/+ = slightly better than E5 finish
− = acceptable, E5 finish and poorer
− − = unsatisfactory Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for producing a satinized surface on an aluminium substrate, comprising the method steps:
   providing an aluminium substrate;
   treating by blasting with a blasting material the surface regions of the aluminium substrate provided that are to be satinized;
   wherein there is used as the blasting material a mixture of angular and spherical particles having a grain diameter $D_{90}$ of ≤0.3 mm.

2. The method as claimed in claim 1, wherein a new grain blasting material particle mixture has:
   a) a content of angular new grain particles of between ≤80% by weight and ≥20% by weight or;
   b) a content of round new grain particles of between ≥20% by weight and ≤80% by weight;
   based on the total weight of the new grain blasting material particle mixture, wherein the total composition of the angular grain particles and the round new grain particles is 100% by weight.

3. The method as claimed in claim 1, wherein there is used as the blasting material a mixture of angular and spherical particles having a grain diameter $D_{90}$ of ≤0.3 mm and ≥0.01 mm.

4. The method as claimed in claim 1, wherein the method comprises the following method steps:
   anodizing the surface regions treated by blasting; and
   sealing the surface regions to be anodized.

5. The method as claimed in claim 1, wherein the spherical particles have an average hardness of ≥250 HV and ≤500 HV.

6. The method as claimed in claim 1, wherein the angular particles have an average hardness of ≥600 HV.

7. The method as claimed in claim 1, wherein the blasting material particle mixture has an average content:
   a) of angular particles of ≤80% by weight and ≥20% by weight; or
   b) of spherical particles of between ≥20% by weight and ≤80% by weight, based on the total weight of the blasting material particle mixture.

8. The method as claimed in claim 1, wherein the blasting speed in the blasting process is on average from ≥30 m/s to ≤100 m/s.

9. The method as claimed in claim 1, wherein in the blasting process the pressure of the jet of particles at an outlet nozzle is from ≥2 bar to ≤10 bar.

10. The method as claimed in claim 1, wherein the substrate surface to be satinized is at least one of:
    deoxidized, deoxidized and pickled, or pickled, after the blast treatment and before anodization; and
    subjected to a polishing treatment after the blast treatment and before anodization.

11. The method as claimed in claim 1, wherein the blast treatment is carried out by means of a centrifugal wheel blasting device, an injector blasting device, or pressure blasting device.

12. A blasting material suitable for the blast treatment of aluminium surfaces by a method of claim 1, wherein the blasting material comprises a mixture of angular and spherical particles having a grain diameter $D_{90}$ of ≤0.3 mm.

13. The blasting material as claimed in claim 12, wherein a new grain blasting material particle mixture has:
    a) a content of angular new grain particles of between ≤80% by weight and ≥20% by weight or
    b) a content of round new grain particles of between ≥20% by weight and ≤80% by weight;
    based on the total weight of the new grain blasting material particle mixture, wherein the total composition of angular and round new grain particles is 100% by weight.

14. The blasting material as claimed in claim 12, wherein
    a) the spherical particles have an average hardness of ≥250 HV and ≤500 HV; or
    b) the angular particles have an average hardness of ≥600 HV, in particular ≥640 HV.

15. The blasting material as claimed in claim 12, wherein the angular or spherical particles comprise iron-based metal alloys, wherein the angular particles comprise iron-based metal alloys which have a martensitic matrix with chromium carbides; and the angular particles comprise a chromium carbide-containing stainless steel; or wherein the spherical particles comprise a stainless steel, and the stainless steel has an austenitic microstructure.

16. The blasting material as claimed in claim 12, wherein the blasting material comprises a mixture of angular and spherical particles having a grain diameter $D_{90}$ of ≤0.3 mm and ≥0.01 mm.

* * * * *